United States Patent [19]

Shimada et al.

[11] 4,152,571
[45] May 1, 1979

[54] BRAZING METHOD

[75] Inventors: Wataru Shimada; Kazumichi Machida; Masaru Okada, all of Amagasaki, Japan

[73] Assignee: Mitsubishi Denki Kabushiki Kaisha, Tokyo, Japan

[21] Appl. No.: 798,458

[22] Filed: May 19, 1977

[30] Foreign Application Priority Data

May 25, 1976 [JP] Japan .................. 51-60860

[51] Int. Cl.² ............................................. B23K 31/02
[52] U.S. Cl. ........................... 219/85 M; 219/85 BM; 219/85 R; 219/121 P
[58] Field of Search ............ 219/85 BM, 85 R, 85 M, 219/85 H, 121 P; 228/240, 244, 251, 258

[56] References Cited

U.S. PATENT DOCUMENTS

| 2,174,218 | 9/1939 | Greene | 219/85 M X |
| 2,768,271 | 10/1956 | Meredith et al. | 219/85 M |
| 3,601,573 | 8/1971 | Shutey | 219/85 H |
| 3,735,088 | 5/1973 | Hall | 219/85 R |

OTHER PUBLICATIONS

Bowning, J. A., Plasma-A Substitute for the Oxy Fuel Flame Welding J. Sep. 1959, pp. 870-875.

*Primary Examiner*—Richard R. Kucia
*Attorney, Agent, or Firm*—Oblon, Fisher, Spivak, McClelland & Maier; Anonymous, Needle Arc & Plasma Arc.

[57] ABSTRACT

In a brazing method of brazing a joint at the contacted surfaces of two base metals, the surfaces of the base metals are arc heated to the optimum brazing temperature of higher than a melting point of a brazing alloy and lower than a melting point of the base metal with the temperature gradient gradually lowering from one end to the opposite end, while feeding the brazing alloy from the end in the lower temperature side into the clearance between the contacted surfaces of the base metals or disposing the brazing alloy in the clearance before heating.

A soft plasma arc is used as the heat source to heat the joint from one end to the opposite end.

3 Claims, 7 Drawing Figures

BRAZING METHOD

BACKGROUND OF THE INVENTION

1. Field of the Invention

The present invention relates to a brazing method of brazing a joint at the contacted surfaces of two base metals, which is especially effective for brazing a large joint.

2. Description of the Prior Art

In the description of the conventional method and the embodiments of the present invention, the embodiments of large size joints will be illustrated, because the present invention attains especially remarkable effect in the case of large size joints.

FIG. 1 shows a large size lap joint of copper bar as one example for the illustration including the relative dimension of the joint.

In FIG. 1, the reference numerals (1) and (2) respectively designate base metal plates made of copper, etc. which form a joint but may designate any metals capable of being brazed; (3) designates the clearance of the joint which is the space between the plates.

Heretofore, in a operation brazing the lap joint, the operator made an effort to uniformly heat all of the joint with a gas flame such as an oxygen-propane flame while disposing a brazing sheet in the clearance or feeding a brazing rod from the peripheral edge of the joint.

However, in accordance with the conventional brazing method, non-adhered parts or voids are formed in the clearance, whereby a suitable brazing operation could not be attained.

FIG. 2 is a schematic view of one example of the brazing condition of a joint brazed by the conventional brazing method which is observed by the X-ray test, wherein the reference numeral (4) designates adhered parts with a brazing alloy; (5) designates base metals; (6) designates non-adhered parts on which the brazing alloy is spread; and (7) designates voids on which the brazing alloy is not spread.

When the brazing is performed by the conventional brazing method, the percent of adhered area is usually in a range of about 60 to 70%.

Even though suitable flux is precisely prepared or a skillful operator carefully works the brazing, the percent of adhered area is about 80%.

It is considered that the gas and the impurities produced from the flux in the clearance (3) remain in the clearance (3) while clogging the discharging outlet because all surfaces of the joint are uniformly heated to reach the optimum temperature and the brazing alloy is fed from the peripheral part of the clearance (3) in the conventional brazing method.

SUMMARY OF THE INVENTION

The present invention is to provide a brazing method of brazing a joint at the contacted surfaces of two base metals which comprises heating the one edge of the base metals which produces a temperature gradient between that edge and the other edge, the temperature gradient being gradually lowered from one end to the opposite end with the optimum temperature higher than a melting point of a brazing alloy and lower than a melting point of the base metal and feeding the brazing alloy from the lower temperature side into the clearance between the contacted surfaces of the base metals or disposing the brazing alloy in the clearance before heating. Any flux appropriate for brazing may be used.

In the heating operation, a soft or diffuse plasma arc is used as the heat source to attain an excellent effect.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings.

DETAILED DESCRIPTION OF THE PREFERRED EMBODIMENTS

The object of the present invention is to prevent the defect caused by the conventional brazing method in order to improve the percent of adhered area.

Figure 1:
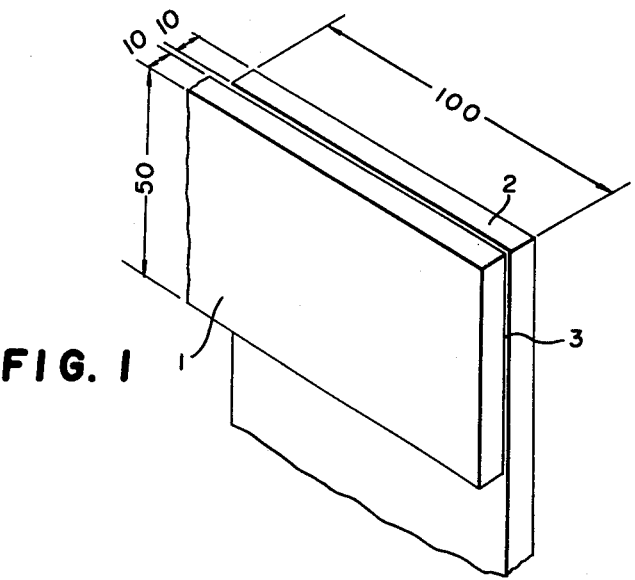
FIG. 1 is a schematic view of a joint used for illustrating the brazing method of the present invention.
Figure 2:
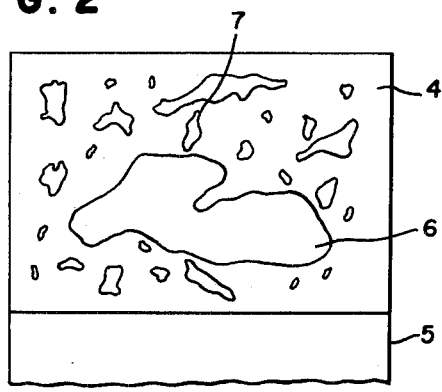
FIG. 2 shows a condition of the joint of FIG. 1 brazed by the conventional brazing method.
Figure 5:
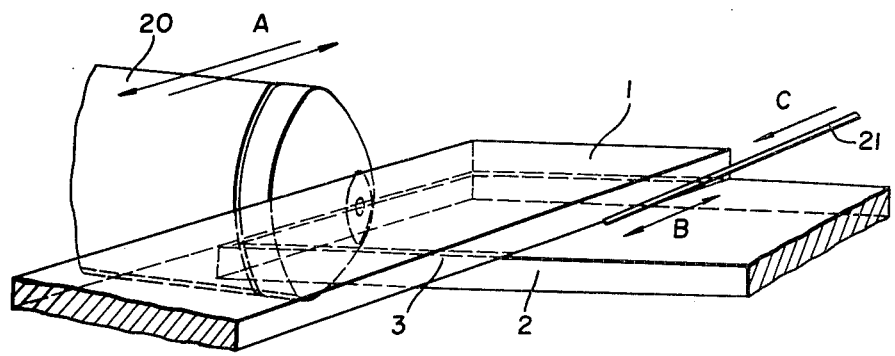
FIG. 5 is a schematic view of one embodiment of the brazing operation in accordance with the present invention.
Figure 7:
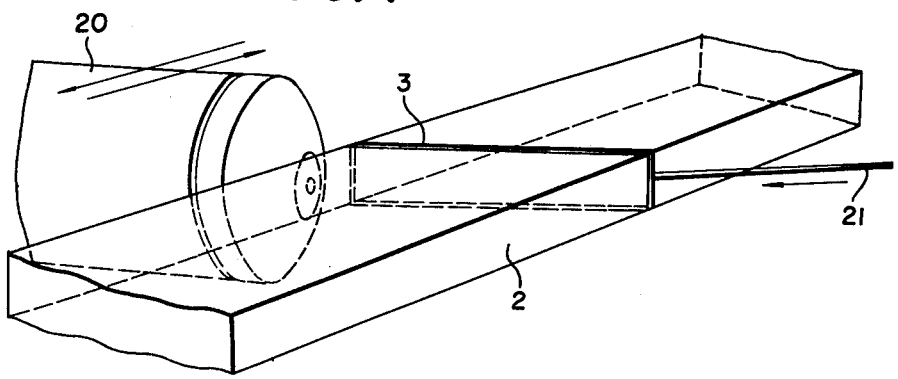
FIG. 7 is a schematic view of the other embodiment in the brazing operation in accordance with the present invention.

In the brazing method of the present invention, the base metal plates (1), (2) which are contacted in a wide area as shown in FIGS. 1, 5 and 7 are heated to form a suitable temperature gradient from one end to the opposite end of the joint and the molten brazing alloy is spread in the clearance (3) in the direction of the temperature gradient and the molten brazing alloy is contacted with all surfaces in the clearance and the gas and the other impurities are sequentially discharged from the clearance by the molten brazing alloy.

When a gas flame is used as the heat source, the quantity of heat per unit time is not enough. In the case of the large size joint of FIG. 1 which preferably has the base metal plates made of a heat conductive material such as copper, when the joint is heated from one end of the joint, it is difficult to heat the opposite end to the brazing temperature under suitable temperature gradient. Accordingly, it is necessary to uniformly heat all of surfaces of the joint in the brazing operation whereby the above-mentioned disadvantageous result is caused.

In order to overcome this disadvantage, it is considered that the satisfactory result can be attained by using a heat source which imparts a large quantity of heat per unit time.

When the conventional non-consumable electrode type arc such as TIG welding arc is applied, the quantity of heat per unit time is remarkably larger than that of the gas flame, however, the heating density is remarkably high whereby the base metal plates at the just heated part are disadvantageously melted before all of the surfaces of the joint reach the brazing temperature even though the arc source is oscillated.

However, when the soft plasma arc is used as the heat source, both the quantity of heat per unit time and the heating density are suitable whereby the base metal plates of the joint can be heated in suitable temperature gradient without melting the base metal plates (1), (2).

Figure 3:
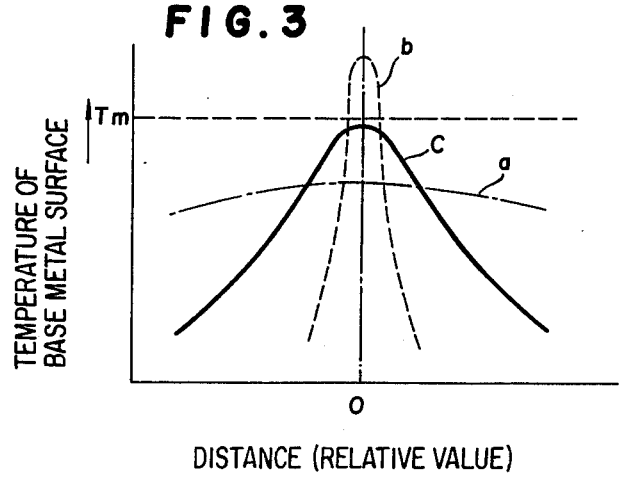
FIG. 3 is a diagram of temperature gradient of base metal surfaces when using different heat sources.
Figure 4:
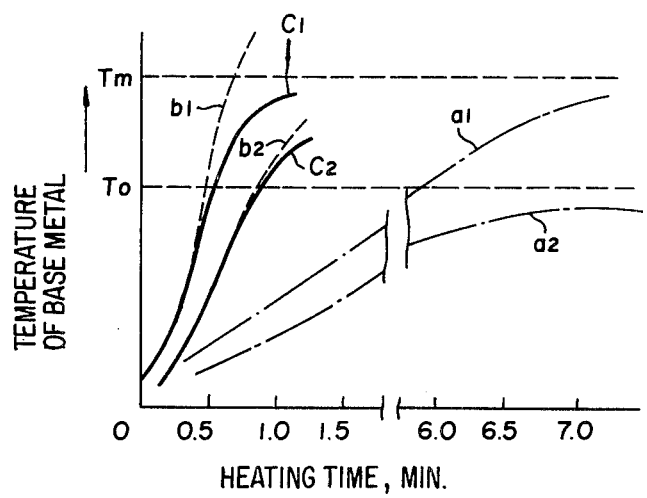
FIG. 4 is a diagram showing temperature rising characteristics in the heated end of the base metal plates and the opposite end thereof when using different heat sources.

FIGS. 3 and 4 are diagrams of temperature gradient for illustrating the facts.

In FIG. 3, the temperature gradient on the surfaces of the base metal plates after are shown to indicate the heating density on the surface of the base metal plate heated for equal time period by various heat sources wherein the reference 0 designates a center of each heat source; a designates temperature gradient curve when heating by the gas flame and b designates that of heating by the TIG welding arc and c designates that of heating by the soft plasma arc and Tm designates a melting point of the base metal plates (1), (2).

As it is clear from FIG. 3, when they are heated by the gas flame, the heating characteristic is a broad distribution with a small quantity of heat. When they are heated by the TIG welding arc, the heating density is too high whereby the temperature of the base metal plates just below the heat source is higher than the melting point of the base metal.

When they are heated by the soft plasma arc, the heating characteristic for supplying large quantity of heat in suitable heat density is found.

FIG. 4 is a diagram of the characteristics showing the rises of the temperature of the base metal plates when heating one end of the joint of FIG. 1 while oscillating each of the heat sources, wherein the temperature at the heating side and the temperature at the opposite side feeding the brazing alloy, which is distant from the heat source, are measured.

The references $a_1$ and $a_2$ designate temperature rising characteristics in the heating side ($a_1$) and in the brazing alloy feeding side ($a_2$) in the case heated by the gas flame; the references $b_1$ and $b_2$ designate temperature rising characteristics in the heating side ($b_1$) and in the brazing alloy feeding side ($b_2$) in the case heated by the TIG welding arc; and the references $C_1$ and $C_2$ designate temperature rising characteristics in the heating side ($C_1$) and the brazing alloy feeding side ($C_2$) in the case heated by the soft plasma arc and the reference $T_0$ designates the minimum temperature for brazing.

When the large size joint is heated from one end, the quantity of heat is short even in the heating side in the case heated by the gas flame whereby it takes a long time for heating it to the brazing temperature $T_0$. In the brazing alloy feeding side, it is difficult to reach the brazing temperature $T_0$ even though it is heated for a long time because of large heat loss caused by the heat conductance and radiation.

On the other hand, in the case heated by the TIG welding arc, the temperature of the joint is rapidly raised, however, the temperature of the base metal plate in the heating side is over the melting point Tm of the base metal to melt it before reaching the temperature $T_0$ in the brazing alloy feeding side.

On the other hand, in the case heated by the soft plasma arc, the temperatures of the joint in the heating side and in the brazing alloy feeding side can be rapidly raised, and it is possible to heat it to be higher than $T_0$ in the brazing alloy feeding side while maintaining a suitable temperature gradient without raising the temperature in the heating side to be higher than Tm.

FIG. 5 shows the brazing method of the present invention for efficiently preparing a brazed joint having no defect by using the soft plasma arc.

In FIG. 5, the reference numeral (20) designates a soft plasma arc torch; (21) designates a brazing rod. As shown in FIG. 5, the soft plasma arc torch (20) is oscillated in the longitudinal direction (arrow line direction) of the edge of the joint thereby providing the heating condition as a longitudinal heat source for uniformly heating all edge surfaces of the joint, and efficiently raising them to the brazing temperature under the temperature gradient from the heating side to the opposite side.

In the operation, the end of the brazing rod (21) is touched on the brazing alloy feeding side so as to initiate the supply of the brazing alloy from the arrow line B and the arrow line C at the initiation of the melting.

The brazing operation is accomplished by confirming the slight discharge of the molten brazing alloy to the edge surface at the heating side, to attain the brazed joint having no defect and about 100% of adhered area in safety and high efficiency.

The quantity of heat by the soft plasma arc can be accurately controlled by the arc current and voltage whereby the brazing operation can be attained in high reproducibility and in automation.

Figure 6:
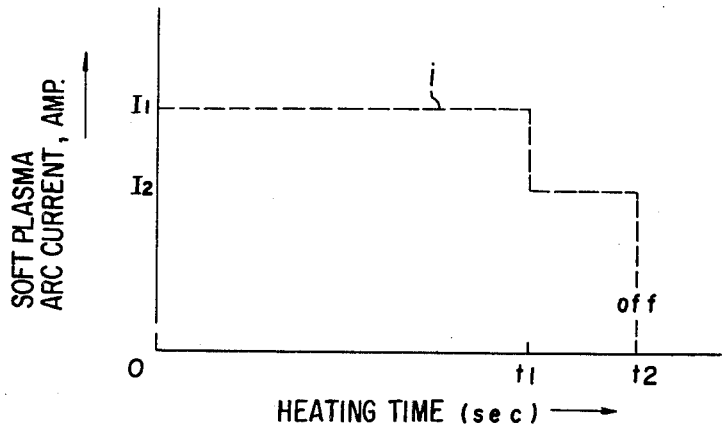
FIG. 6 is a diagram of a heating pattern in the brazing method of the present invention.

FIG. 6 (a) (b) shows the heating patterns in the automatic brazing operation wherein the sequential control of the arc current to the heating time is performed.

In FIG. 6 (a), the reference (i) designates the controlled arc current; $t_1$ designates the time for maintaining the arc current $I_1$ in order to reach the temperature of the joint to the brazing temperature; $t_1$-$t_2$ designates the time for maintaining the arc current $I_2$ after reaching to the brazing temperature in order to maintain a suitable temperature gradient and the brazing temperature until the finish of the brazing operation and the extinction of the arc.

The table shows one example of a sequence for the brazing operation to joints having different thicknesses and the same adhered area.

Table

| Thickness of plates mm | Control factor | | | |
| --- | --- | --- | --- | --- |
| | $I_1$ (amp) | $t_1$ (sec) | $I_2$ (amp) | $t_2$ (sec) |
| 2-2 | 90 | 40 | 70 | 55 |
| 6-6 | 190 | 50 | 160 | 65 |
| 15-6 | 200 | 60 | 180 | 75 |
| 15-15 | 220 | 70 | 190 | 85 |
| adhered area 1500 mm$^2$ constant | | | | |

At the finish of the brazing operation, the variation of the arc voltage for several to several tens percent caused by the discharge of the molten brazing alloy on the edge surface in the heating side is detected to extinguish the arc and to stop the supply of the brazing rod (21).

It is possible to attain the full automatic-brazing method by combining the above-mentioned automatic stopping mechanism with an automatic feeding mechanism for initiating the feeding at the time detecting the initiation of the melting of the brazing alloy while contacting the end of the brazing rod (21) with the edge surface at the brazing alloy feeding side.

In the description, a large size joint having relatively a large capacity has been illustrated.

Of course, the remarkable effect can be attained by applying the brazing method of the present invention to the lap joint and the butt joint.

FIG. 7 shows the brazing method of the present invention for preparing a brazed butt joint.

In the case of disposing a brazing sheet in the clearance, the temperature gradient of the joint can be attained by the method of the present invention, whereby the directional spreading of the molten brazing alloy in the clearance of the joint can be attained. Accordingly, remarkable quality improvement can be attained in comparison with the conventional method.

In the method of brazing two base metals contacted in a wide area in accordance of the present invention, the contacted surfaces of the base metals are heated to the brazing temperature of higher than a melting point of a brazing alloy and lower than a melting point of the base metal with the temperature gradient gradually lowering from one end to the opposite end while feeding the brazing alloy from the end in the lower temperature side into the clearance between the contacted surfaces of the base metals or disposing the brazing alloy in the clearance. The molten brazing alloy is spread from one end to the other heating end while filling the clearance between the contacted surfaces whereby the gas or the impurities formed from the flux etc. in the clearance are gradually discharged to form excellent brazed product having substantially no void nor the non-adhered part.

When large size base metals having high heat conductivity are brazed, remarkable results can be attained by using the soft plasma arc as the heat source.

What is claimed is:

1. In a brazing method for brazing two base metals contacted in a wide area with a clearance between the two, an improvement characterized in that the surfaces of the base metals are heated by a soft plasma arc to the brazing temperature of higher than the melting point of the brazing alloy and lower than the melting point of the base metal so as to produce a temperature gradient gradually lowering from one end to the opposite end of the joint while feeding the brazing alloy from the end in the lower temperature side into the clearance between the contacted surfaces of the base metals whereby the temperature gradient permits the clearance to be purged of impurities.

2. A brazing method according to claim 1 wherein said one end of the contacted surface is heated by the soft plasma arc which is oscillated along the clearance of the contacted surfaces.

3. A brazing method according to claim 1 wherein the brazing alloy is disposed in the clearance before heating.

* * * * *